United States Patent
Schabel et al.

(10) Patent No.: US 12,404,453 B2
(45) Date of Patent: Sep. 2, 2025

(54) HELICAL STIRRING SYSTEM FOR A PLASTIC CONVERSION VESSEL

(71) Applicant: RES POLYFLOW LLC, San Francisco, CA (US)

(72) Inventors: Jay Schabel, Hiram, OH (US); George W. Strekal, Conneaut, OH (US); Richard A. Schwarz, Akron, OH (US); Mehmet A. Gencer, Brecksville, OH (US); Richard K. Peterson, Huntertown, IN (US)

(73) Assignee: RES Polyflow LLC, San Francisco, CA (US)

( * ) Notice: Subject to any disclaimer, the term of this patent is extended or adjusted under 35 U.S.C. 154(b) by 788 days.

(21) Appl. No.: 17/411,811

(22) Filed: Aug. 25, 2021

(65) Prior Publication Data
US 2022/0064533 A1    Mar. 3, 2022

Related U.S. Application Data

(60) Provisional application No. 63/071,404, filed on Aug. 28, 2020.

(51) Int. Cl.
| | | |
|---|---|---|
| *C10B 7/02* | (2006.01) | |
| *B01F 27/091* | (2022.01) | |
| (Continued) | | |

(52) U.S. Cl.
CPC .............. *C10B 7/02* (2013.01); *B01F 27/091* (2022.01); *B01F 27/1124* (2022.01);
(Continued)

(58) Field of Classification Search
CPC .......... A23G 9/224; A23G 9/045; A23G 9/04; A23G 9/22; B01F 15/00019;
(Continued)

(56) References Cited

U.S. PATENT DOCUMENTS 2,509,543 A * 5/1950 Truax .................... B65G 33/34
366/310
2,587,127 A * 2/1952 Erickson ................. A23G 9/20
62/343
(Continued)

FOREIGN PATENT DOCUMENTS

DE    102012204648 A1    9/2013
EP    3186556 B1    10/2019
(Continued)

OTHER PUBLICATIONS

Japanese Search Report for corresponding Japanese Application 2023-513141 dated Feb. 28, 2024.
(Continued)

*Primary Examiner* — Charles Cooley
(74) *Attorney, Agent, or Firm* — Hudak, Shunk & Farine Co. LPA (57) ABSTRACT

A plastic pyrolytic conversion vessel comprises a conveying mechanism for moving a liquid, or a semi-molten, or a molten waste material, or a solid inert residue, or any combination thereof through the vessel. During pyrolyzation of the waste material, the same is heated and vaporized and undergoes in situ chemical reactions comprising cracking, recombination, reforming, recracking, and the like, and is subsequently removed from the vessel. A plurality of scraper blades serve to mix the liquid, or the semi-molten, or the molten waste material, or a solid inert residue, or any combination thereof and convey the waste material forward toward a vessel egress. In another embodiment, one or more sweeping devices serve to move forward the waste material that is located between adjacent rotating conveyor devices.

21 Claims, 3 Drawing Sheets

(51) Int. Cl.
    *B01F 27/1124* (2022.01)
    *B01F 27/1143* (2022.01)
    *B01F 27/72* (2022.01)
    *B01F 101/00* (2022.01)
    *B01J 6/00* (2006.01)
    *B01J 19/20* (2006.01)
    *C10B 7/10* (2006.01)
    *C10B 53/07* (2006.01)
    *F23G 7/12* (2006.01)

(52) U.S. Cl.
    CPC .......... *B01F 27/1143* (2022.01); *B01F 27/72* (2022.01); *B01J 6/008* (2013.01); *B01J 19/20* (2013.01); *C10B 7/10* (2013.01); *C10B 53/07* (2013.01); *F23G 7/12* (2013.01); *B01F 2101/2805* (2022.01); *F23G 2205/121* (2013.01)

(58) Field of Classification Search
    CPC ............ B01F 15/00058; B01F 15/0298; B01F 27/091; B01F 27/1124; B01F 27/1143; B01F 27/72; B01F 2101/2805; B01F 27/071; B01F 27/0726; B01F 27/1145; B01F 27/1921; C10B 7/02; C10B 7/10; C10B 53/07; C10B 47/34; C10B 47/44; B01J 6/008; B01J 19/20; F23G 7/12; F23G 2205/121; Y02P 20/143; C10G 1/10
    USPC .................... 366/310, 312, 313; 62/342–343
    See application file for complete search history.

(56) References Cited

U.S. PATENT DOCUMENTS

| | | | | |
|---|---|---|---|---|
| 3,292,911 A * | 12/1966 | Paul | B01F 27/1921 | 366/313 |
| 3,476,522 A * | 11/1969 | Stovall | B01F 27/9211 | 422/138 |
| 3,624,805 A * | 11/1971 | Hagemuller | B01F 27/091 | 366/261 |
| 3,877,881 A * | 4/1975 | Ono | B01F 27/9211 | 422/138 |
| 4,201,558 A * | 5/1980 | Schwitters | A23G 9/281 | 141/46 |
| 4,202,437 A | 5/1980 | Gordon | | |
| 4,515,483 A * | 5/1985 | Muller | B01F 27/091 | 366/311 |
| 4,571,091 A * | 2/1986 | Pardo | B01F 27/82 | 366/311 |
| 4,733,607 A * | 3/1988 | Star | B01F 27/82 | 366/85 |
| 4,900,158 A * | 2/1990 | Ugolini | B01F 27/726 | 366/144 |
| 4,950,081 A * | 8/1990 | List | B01F 27/702 | 366/85 |
| 5,074,125 A * | 12/1991 | Schifferly | A23G 9/224 | 366/312 |
| 5,312,184 A * | 5/1994 | Cocchi | A23G 9/224 | 62/343 |
| 5,603,229 A * | 2/1997 | Cocchi | A23G 9/28 | 366/144 |
| 5,615,951 A * | 4/1997 | Gabriele | B01F 27/192 | 99/348 |
| 5,823,675 A * | 10/1998 | Myerly | A23G 9/227 | 366/310 |
| 5,895,790 A * | 4/1999 | Good | C08K 5/14 | 525/194 |
| 5,946,815 A * | 9/1999 | Wetzel | A23N 12/08 | 432/118 |
| 6,010,035 A * | 1/2000 | Estruch | A23G 9/045 | 62/304 |
| 6,058,721 A * | 5/2000 | Midden | A23G 9/045 | 62/342 |
| 6,176,090 B1 * | 1/2001 | Ufema | A23G 9/222 | 366/144 |
| 6,286,724 B1 * | 9/2001 | Midden | B67D 1/0848 | 222/1 |
| 6,349,852 B1 * | 2/2002 | Ford | B67D 1/0871 | 222/64 |
| 6,430,952 B1 * | 8/2002 | Midden | A23G 9/045 | 62/231 |
| 8,641,871 B2 * | 2/2014 | Grispin | B01J 6/008 | 201/40 |
| 10,421,215 B1 * | 9/2019 | Swisher | B01F 27/192 | |
| 10,711,202 B2 * | 7/2020 | Schabel | C10B 7/10 | |
| 11,118,114 B2 * | 9/2021 | Schabel | C10G 1/02 | |
| 11,708,533 B2 * | 7/2023 | Strekal | C10B 33/003 | 34/427 |
| 2007/0280045 A1 * | 12/2007 | Reinecke | B01F 27/091 | 366/312 |
| 2008/0092580 A1 * | 4/2008 | Mavridis | F25C 1/147 | 62/353 |
| 2008/0098765 A1 * | 5/2008 | Bond | A23G 9/045 | 62/353 |
| 2008/0202130 A1 * | 8/2008 | Kadyk | A23G 9/12 | 62/158 |
| 2008/0286557 A1 | 11/2008 | Tucker | | |
| 2010/0127106 A1 * | 5/2010 | Fornasier | B01F 27/171 | 241/257.1 |
| 2012/0055189 A1 * | 3/2012 | Sipp | A23G 9/045 | 222/240 |
| 2012/0272834 A1 * | 11/2012 | Grampassi | A23G 9/224 | 99/455 |
| 2013/0327080 A1 * | 12/2013 | Sipp | A23G 9/04 | 62/342 |
| 2014/0000302 A1 * | 1/2014 | Cocchi | B01F 27/1145 | 62/342 |
| 2014/0332560 A1 * | 11/2014 | Sipp | A23G 9/045 | 222/146.6 |
| 2016/0017232 A1 | 1/2016 | Ullom | | |
| 2016/0040073 A1 | 2/2016 | Bakaya et al. | | |
| 2017/0208833 A1 * | 7/2017 | Cocchi | B01F 27/074 | |
| 2017/0283706 A1 * | 10/2017 | Schabel | C10B 7/10 | |
| 2019/0357565 A1 * | 11/2019 | Dong | A23G 9/224 | |
| 2019/0357566 A1 * | 11/2019 | Dong | A23L 2/54 | |
| 2020/0199457 A1 * | 6/2020 | Schabel | C10B 7/10 | |
| 2020/0221726 A1 * | 7/2020 | Cocchi | B01F 27/0724 | |
| 2022/0063966 A1 * | 3/2022 | Strekal | B01J 19/0053 | |
| 2022/0064533 A1 * | 3/2022 | Schabel | C10B 7/02 | |
| 2022/0064535 A1 * | 3/2022 | Strekal | C10B 53/07 | |
| 2022/0065535 A1 * | 3/2022 | Schabel | F27D 13/00 | |
| 2023/0027849 A1 * | 1/2023 | Mouri | B09B 3/00 | |
| 2023/0150756 A1 * | 5/2023 | Heymans | A23G 9/281 | 99/295 |
| 2023/0263185 A1 * | 8/2023 | Dong | A23G 9/22 | 366/144 |
| 2024/0049742 A1 * | 2/2024 | Lazzarini | B01F 35/123 | |
| 2024/0263087 A1 * | 8/2024 | Peterson | C10G 65/02 | |

FOREIGN PATENT DOCUMENTS

| | | | | |
|---|---|---|---|---|
| EP | 4563219 A1 * | 6/2025 | ............ | B01F 27/70 |
| GB | 2329098 A | 3/1999 | | |
| JP | 4-506624 A | 11/1992 | | |
| JP | 9-279161 A | 10/1997 | | |
| JP | 10-342 A | 1/1998 | | |
| JP | 2005-200538 A | 7/2005 | | |
| JP | 2015-512965 A | 4/2015 | | |
| JP | 2015-192997 A | 11/2015 | | |
| JP | 2019-11410 A | 1/2019 | | |
| JP | 2019-513180 A | 5/2019 | | |
| KR | 10-2011-0075308 A | 7/2011 | | |
| KR | 20140093039 A | 7/2014 | | |
| WO | WO-2011077372 A2 * | 6/2011 | ............ | A23G 9/04 |
| WO | WO-2011077396 A2 * | 6/2011 | ............ | A23G 9/045 |
| WO | WO-2012085692 A1 * | 6/2012 | ............ | A23G 9/045 |

(56) References Cited

FOREIGN PATENT DOCUMENTS

WO      WO-2015176473 A1 * 11/2015 ............... A23G 9/04
WO      2019164811 A1    8/2019

OTHER PUBLICATIONS

European Search Report for corresponding European Application 21862708.1 dated Sep. 26, 2024.
Supplementary European Search Report for corresponding European Application 21862708.1 dated Jan. 23, 2025.
English translation of Korean Intellectual Property Office Notice of Grounds for Rejection dated Apr. 16, 2025 for the corresponding Korean Application 10-2023-7007256.

* cited by examiner

HELICAL STIRRING SYSTEM FOR A PLASTIC CONVERSION VESSEL

FIELD OF THE INVENTION

Pyrolytic reactors generally contain small amounts of solid inert residues such as clay, talc, etc., that are not volatilized and must be removed from the reactor. The present invention relates to a plastic conversion vessel that contains one or more shafts that have one or more conveying devices thereon with one or more of said conveying devices having scraper blades thereon that contact the bottom of said conversion vessel. Upon rotation of said shaft, said conveying devices move waste material such as a semi-molten material, or a molten material, or a solid inert residue, or any combination thereof, through said vessel until said materials, other than said solid inert residue, are thoroughly vaporized with said scraper blades stirring the noted molten materials.

BACKGROUND OF THE INVENTION

Pyrolytic reactors generally transform various plastic and hydrocarboneous waste materials into one or more substances by heat alone, that is without any oxidation. Such processes involve in situ chemical reactions comprising cracking, recombination, reforming, recracking, and the like. During this process, the plastic and hydrocarboneous waste material is generally evaporated to yield various different products that have commercial use. However, since plastics such as polymers generally contain inert additives such as clay, silica, talc, alumina, calcium carbonate, mica, mineral fibers, glass, fiberglass, metallic particles and fibers, carbon black, and the like, the same are not vaporized but generally remain within the reactor as a solid inert residue. This residue must be removed to permit continued efficient operation of the pyrolysis operation.

More specifically, as waste material is vaporized in a polymer conversion unit as it is moved along various heating zones of the vessel, solid inert residues (SIR) drop to the bottom of the vessel during the pyrolytic vaporization process. In order to remove the SIR, it must be moved forward through the reactor vessel and discharged therefrom. This process is somewhat difficult and often does not result in complete removal of the SIR that can cause a shut down in order that the SIR can be removed from the reactor.

SUMMARY OF THE INVENTION

The present invention relates to a plastic conversion vessel comprising a pyrolytic reactor having a conveying mechanism for moving waste comprising plastic material such as polymers, or hydrocarboneous material, or solid inert residue (SIR)through the reactor. During pyrolyzation of the plastic and hydrocarboneous materials, the same is heated, mixed, and through in situ chemical reactions comprising cracking, recombination, reforming, recracking, and the like, the waste is volatilized and subsequently removed from the reactor. Generally, the SIR additives initially contained in the polymers remain in the reactor during pyrolyzation. A conveying mechanism of the present invention moves the solid inert additives through and out of the reactor.

A plastic conversion vessel, comprises an ingress and an egress, one or more shafts, said one or more shafts, independently, having a rotatable conveying device, said rotatable device comprises one or more rakes for moving waste comprising a liquid, or a semi-molten material, or a molten material, or a solid inert residue, or any combination thereof, through said vessel towards said egress, said semi-molten and/or said molten material comprising one or more polymers or hyrdocarboneous compounds, or both; said conveying device, independently, having one or more scraper blades; said scraper blades operatively, and independently attached to said rake; and said attached scraper blades, independently, having a height so that they can scrape the bottom of said vessel upon rotation of said conveying device.

A process for stirring material in a plastic conversion vessel, comprising the steps of: moving waste material comprising a liquid, or a semi-molten material, or a molten material, or a solid inert residue, or any combination thereof, through a pyrolytic conversion vessel, said vessel comprising one or more shafts, independently, having a rotatable conveying device, said rotatable device comprising one or more rakes for moving said waste material, or any combination thereof, through said vessel towards said egress, said semi-molten, and/or said molten material comprising one or more polymers or hydrocarboneous compounds, or both; said conveying device, independently, having one or more scraper blades; said scraper blades operatively, and independently attached to said rake; and said attached scraper blades, independently, having a height so that they can scrape the bottom of said vessel upon rotation of said conveying device.

A plastic conversion vessel, comprising: said vessel having an ingress, an egress, and an interior wall; at least two shafts independently having a rotatable conveyor device for moving waste material or a solid inert residue, or both, through said vessel towards said egress; at least one support housing in said vessel, said support housing located between said rotatable conveying devices, said support housing have arms that are fixed to said vessel interior wall; and said conveying device having auxiliary scraper blades that are retractable so that they are capable of sweeping under said support device and moving said waste material therethrough.

BRIEF DESCRIPTION OF THE DRAWINGS

The foregoing and other features of the present invention will become apparent to those skilled in the art to which the present disclosure relates upon reading the following description with reference to the accompanying drawings, in which.

DETAILED DESCRIPTION OF THE INVENTION

Polymer conversion unit (PCU)

Vessel 300 of the present invention can generally be any vessel, known to the art or to the literature wherein physical and/or chemical reactions can occur and desirably are free of air and oxygen.

Figure 1:
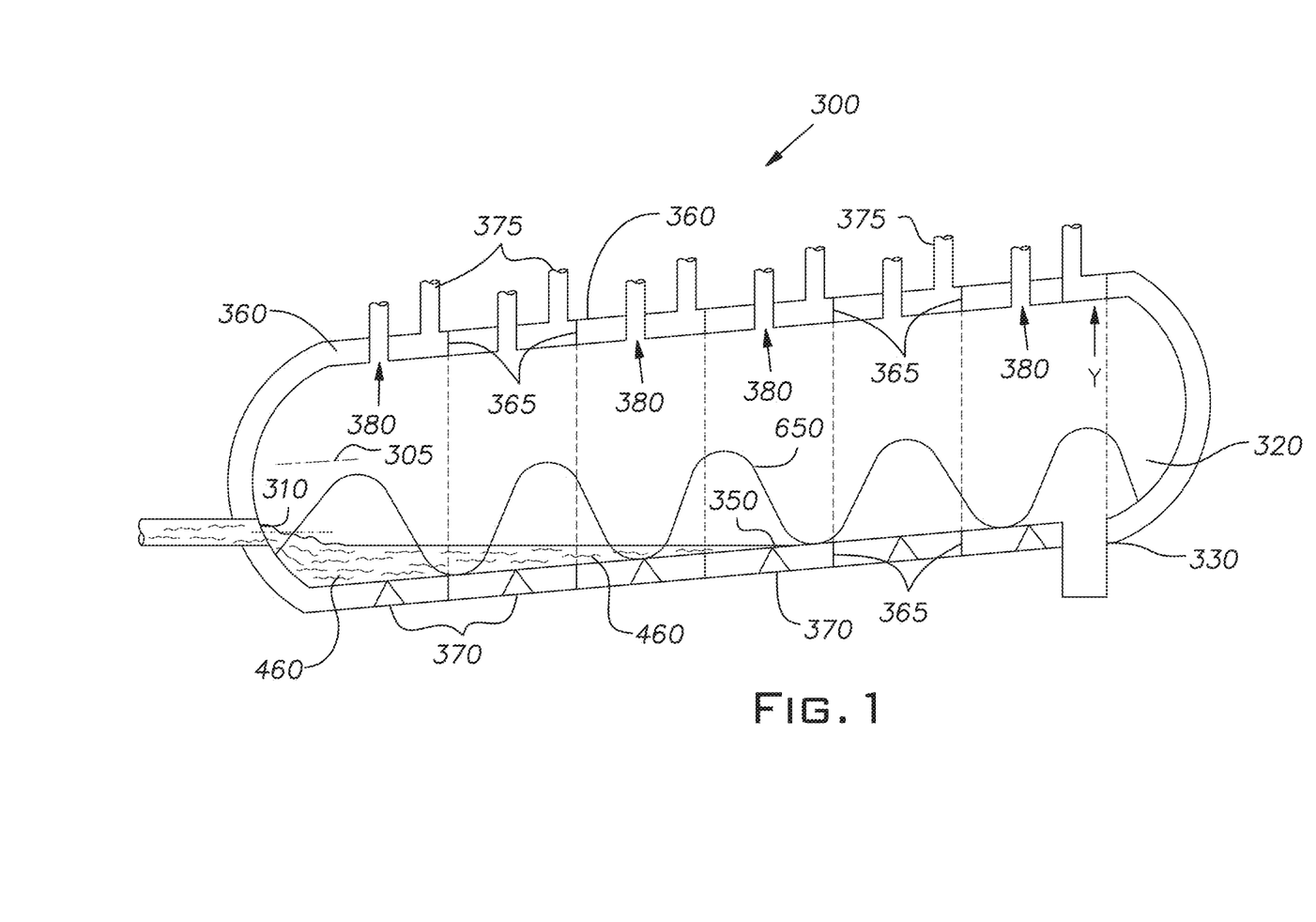
FIG. 1 is a schematic view of a plastic conversion vessel of the present invention wherein various reactions can occur.

That is, the total amount of oxygen based upon the total internal volume of the vessel is less than about 3 volume percent, desirably less than about 2 volume percent, and preferably less than about 1 volume percent, and more preferably nil, that is it is totally free of any air or oxygen. Hence, pyrolytic vessels can be utilized. Vessel 300 does not rotate and does not contain any added catalysts. That is, it is free of any catalyst that is added except for generally small amounts of catalysts that may be inherently contained in one or more polymers and the like. The vessel can generally have multiple heating units 370, multiple reaction stages, multiple product gas exhaust vents 380, and the like, or any combination thereof. Optionally, but preferably, vessel 300 contains an outer shroud 360 having a plurality of inner walls 365 that extend from the shroud to the vessel interior wall 390 and form heated channels for hot gases to heat the vessel. The heat from heaters 370 thus generally travels around the circumference of the generally cylindrical vessel 300 and exits therefrom through heat exhaust channels 375 at the top of the vessel. The heat in the different sections of vessel 300 generally volatize semi-molten or molten (liquid) waste material 460 with the gases generated therefrom egressing from the vessel through product exhaust channels 380 where they are fed to a condensation unit, not shown, with the waste being in the form of different types of usuabte products. Pyrolyzation occurs during transfer of the generally a semi-molten material, or a molten waste material 460, or a solid inert residue, or any combination thereof, along the vessel as in FIG. 2 from input or ingress 310, as by rake 650 to vessel upper end 320 via cracking, recombination, reforming, recracking, and the like. Generally, suitable pyrolyzing temperatures in vessel 300 along axis 305, i.e. from left to right of FIG. 1 or 2, range from about 900° F. to about 1,200° F. with suitable temperatures in the Y axis, that is from the bottom of the vessel to the top of the vessel, range from about 700° F. to about 1,000° F., and generally from about 800° F. to about 950° F. The temperature of the Z axis, that is from the front side of the vessel to the backside thereof is generally fairly constant therethrough. A preferred vessel that is schematically shown in FIG. 1 is described in U.S. Pat. No. 10,711,202 issued Jul. 14, 2020 and is hereby fully incorporated by reference with regard to all aspects thereof. The various known reactions such as cracking, reforming, recombination, and recracking, and the like of the waste material of the present invention generally yield various gases such as alkane gases, or various hydrocarbon gases such as naphtha, or various gas oils such as heavy oil, as well as diesel fuel, jet fuel, maritime fuel, various waxes, additives, various distillates, light weight organic compounds, and the like.

The yield of gaseous product produced by the present invention is very high and is at least about 70 wt. %, desirably at least about 80 wt. %, and preferably at least about 85 wt. % or about 90 wt. % of the feedstock admitted to the vessel. The remaining material is generally classified as a solid inert residue, that is dry, and often contains fillers and other inert material, that is ejected from the upper or egress end 320 of vessel 300 through discharge channel 330.

A desirable aspect of vessel 300 is to generally produce petroleum gas products. Preferable waste material comprise plastics such as polymers in the form of sheets, wrappers, packaging, furniture, plastic housings, containers, and the like, and are utilized that essentially contain only hydrogen and carbon atoms such as polyethylene, high density polyethylene, low density polyethylene, linear low density polyethylene, polypropylene, polystyrene, and the like. Other suitable commercial polymers include polyesters, polyvinylchlorides, polycarbonates, polymethyl methacrylates, nylons, polybutylene, acrylonitrile-butadiene-styrene (ABS) copolymers, polyurethanes, polyethers, poly(oxides), poly(sulfides), polyarylates, polyetherketones, polyetherimides, polysulfones, polyvinyl alcohols; and polymers formed by polymerization of dienes, vinyl esters, acrylates, acrylonitrile, methacrylates, methacrylonitrile, diacids, diols, or lactones, or any combination thereof. Still other polymers include block copolymers of the preceding, and alloys thereof. Polymer materials can also include thermoset polymers such as, for example, epoxy resins, phenolic resins, melamine resins, alkyd resins, vinyl ester resins, crosslinked polyester resins, crosslinked polyurethanes; and also crosslinked elastomers, including but not limited to, polyisoprene, polybutadiene, polystyrene-butadiene, polystyrene-isoprene, polyethylene-propylene, ethylene-propylene-diene, and the like, and blends thereof.

Hydrocarboneous material generally includes compounds that have, of course, primarily only carbon and hydrogen atoms such as various bitumens including bitumen tailings as from a mine, various heavy fractions of a fractionating column that include various heavy oils, greases, semi-asphalt compounds, and the like, that by the present invention, are reduced to lighter components, and are mostly various types of hydrocarbon containing gases.

The various above-noted waste materials often include solid inert material (SIR) such as various fillers, pigments, flame retardants, reinforcement materials, silica, aluminum, talc, glass, clay, and the like. Generally, the amount thereof is about 2% to about 25% by weight, or desirably about 3% to about 20% by weight, or preferably about 3% to about 15% by weight, or most preferably less than about 7% by weight, all based on the total weight of the one or more polymer and/or hydrocarboneous materials. Such compounds generally are not chemically or physically reacted but are emitted from vessel 300 as through vessel discharge channel 330.

In a preferred embodiment, the above different types of waste materials often comprise from about 40% to about 90%, desirably from about 50% to about 85%, and preferably from about 70% to about 80% by weight, of polymers of polyethylenes, polypropylenes and polystyrenes. Any remaining polymers can be, but are not limited to, polyurethane, nylon, PET, and polyvinylchloride, as well as any of the remaining above-noted polymers.

Figure 2:
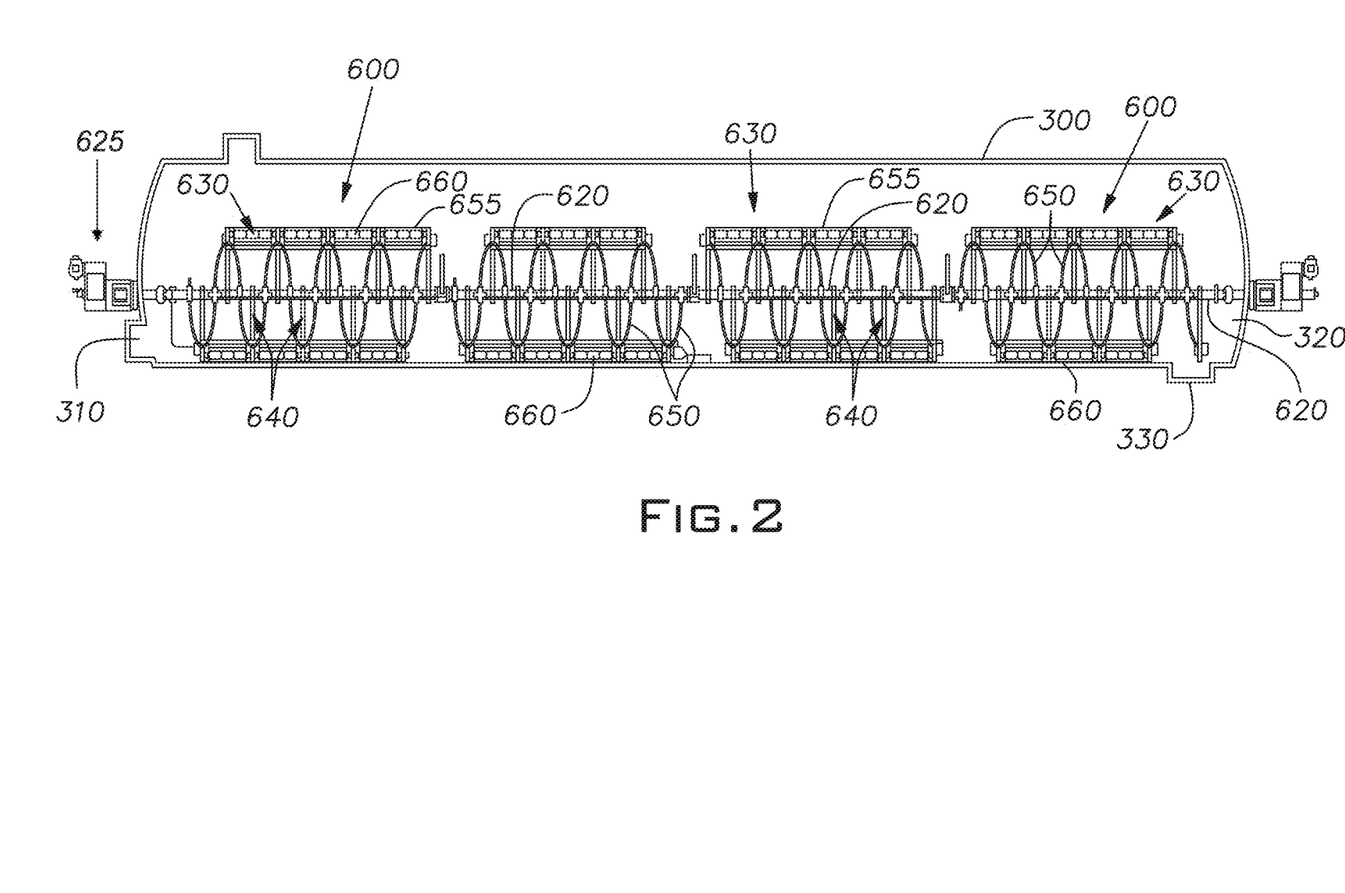
FIG. 2 is a schematic view of a plastic conversion vessel containing a stirring device for conveying a solid inert residue through the conversion unit.

Another waste material often found in association with various plastics such as polymers and hydrocarboneous material are various liquids that are utilized in the manufacture of polymers. Such liquids often include various lubricants, various silicon oils, and various plasticizers, or any combination thereof.

plastic conversion vessel according to the present invention is generally shown in FIG. 2 wherein pyrolytic vessel 300, that can be a vessel as shown in FIG. 1, comprises various heating zones, reaction zones, vaporization output channels, and the like. The plastic conversion vessel, as noted above, generally contains a liquid, or a semi-molten material, or a molten (liquid) waste material, or a solid inert residue, or any combination thereof, such as polymer and/or hydrocarboneous material, that is generally volatilized, other than the inert solid residue, and collected as usable products. Vessel 300 of the present invention also contains one or more stirring assemblies 600 as well as various scraper blades 660 to stir the liquid, or the semi-molten material, or the molten waste material, as well as to remove any solid inert residue that is not volatilized therefrom. In other words, the stirring assembly relates to an internally integrated system to stir the liquid, or the semi-molten material, or the molten waste material, or the solid inert residue material, or any combination thereof.

As noted, the liquid, or the semi-molten material, or the molten waste material, or any combination thereof is vaporized in vessel 300 by independent heating zones along the length of the vessel, with the noted solid inert residues dropping to the bottom of the vessel during the pyrolytic vaporization process. Such solid inert residues are moved through the reactor by helical rakes 650 of stirring assembly 600. During the forward conveyance, the waste material is vaporized until it is totally vaporized at a general location called "beach head" 350, with only the inert residues being moved forward therefrom to be discharged from the reaction via vessel discharge channel 330. Since a significant temperature difference exists between the bottom and top of the vessel, the shape of the bottom vessel is deformed due to different coefficients of expansion. That is, since the bottom of the vessel is heated more than the top portion, it "curves". That is, it has a slight bent "U" shape because the bottom expands a greater distance than the top of the vessel. However, due to the length, shape and location of, individual, independent scrapers 660 of the present invention, scraping and conveying of the solid inert residues is still accomplished.

The internal stirring and solid inert residue assembly 600 of the present invention generally comprises several items. Typically, one or more shafts 620 exist along the length of vessel 300 such as from 2 to about 7 shafts and any number in between. The embodiment set forth in FIG. 2 contains four shafts 620 wherein each shaft, independently, can be the same length, or different from each other. An important aspect of the present invention is that each shaft 620 contains at least one rotating conveyor device 630. The conveyor device comprises several components such as one or more rakes 650, generally a plurality of support arms or spokes 640 that connect rake 650 to shaft 620, one or more longitudinally brackets 655 that are attached to the periphery of rakes 650 in a longitudinal direction of vessel 300, and one or more slidable stir or scraper blades 660 that reside within one or more brackets 655. Thus, the number of combinations of the above noted four structural, conveying components residing on the one or more shafts within vessel 300, is vast As shown in FIG. 2, the one or more helical rakes 650, that in a preferred embodiment is a helical screw, exist on each shaft. That is, rake 650, exists as a helix generally in a longitudinal direction about shaft 620. Rake 650 has a radial width (i.e. a blade) that extends from the inner diameter of the blade to the outer diameter thereof. Such width can vary greatly depending upon the size of vessel 300 as well as the size of stirring and solid inert residue assembly 600. Generally, the radial width is from about 6 to about 18 inches, desirably from about 7 to about 14 inches and preferably from about 8 to about 12 inches. The outer diameter of the radical width of rake 650 is such that when located at the bottom of vessel 300, it is in close proximity to and almost touches the bottom of vessel 300. This close engagement permits the rake such as a helical screw to contact the liquid, the semi-molten and/or molten waste material as well as the solid inert residue. Rotation of shaft 620 as by motor 625 causes conveying device 630 to rotate so that rake 650 provides forward movement of waste material and/or residue in a longitudinal direction along the length of reactor 300 such as from left to right as shown in FIGS. 1 and 2. As previously noted, the waste material will be moved to the vicinity of "beach head" 350 where upon due to evaporation generally no remaining liquid, semi-molten or molten material exists thereafter with only the solid inert residue material being conveyed or moved forward to reactor discharge 330.

As shown in FIG. 2, one or more helical rakes 650 are attached to shaft 620 by a plurality of support arms or spokes 640 the number of which can vary. That is, one end of arm or spoke 640 is attached in any conventional matter, such as by welding, nut and bolt, screws, adhesives, and the like to helical rake 650 and the other end is attached in a similar manner to internal shaft 620. The number of support arms or spokes 640 can be large since with regard to a single revolution of a helical rake the number of such spokes can be 2, 5,10 or even higher. Moreover, the number of individual rakes located along the longitudinal length of any rotating conveyor device 630 can vary from any number such as 1, 2, etc., to about 10, individual rakes. The support arms (and the stirrer, i.e. scrubber blades, as a whole) take up comparatively little volume in the vessel to allow for vapor travel and mixing along the vessel. Additionally, the small comparative volume reduces weight of the stirrer assembly 600 and accordingly erosion and wear is reduced.

Another important aspect of rotatable conveying device 630 is the use of one or more, preferably a plurality of brackets 655 that extend in a longitudinal direction along the axis of vessel 300. Bracket 655 can extend from an initial helical rake or screw 650 to a second, third, fourth, etc. longitudinally downstream helical screw (towards vessel egress 330) as desired. The length of such brackets can be only within each shaft section 620 as shown in FIG. 2, or extend from one shaft to another shaft and so forth. A typical length can be about 30 to about 40 feet. Such extension of course is along the same circumferential helical location (in a straight line), for example at 0° a location with each remaining one or more brackets extending at the same circumferential locations as desired, for example, at each 90° position, or at each 180° position etc., or at each at every 30° position, or at each 60° position, etc., and the like. Bracket 655 can have a regularly outward extending slot or groove therein that serves to receive, for example matingly engage, one or more scraper blades 660. Scraper blades 660 mix, stir, blend, etc., the liquid or the semi-molten, or the molten, or the SIR material, (solid inert residue), or any combination thereof. While bracket 655 is designed so that one or more scraper blades 660 are free to slide a specific radial distance inward and outward thereof, it is always retained therein by any conventional, mechanical, etc. engagement known to the art and literature such as a flange, a restriction, or a narrow opening at the base of the bracket that retains an enlarged base portion of the scraper and the like. Thus, even though upon heating wherein, as noted above, the reactor will have a slight "U" shape bent, the slidable engagement of scraper blades 660 still can readily engage the bottom of the extended distance to the bottom of the vessel and thus serve to convey the waste material through the vessel. The length of each individual scraper blade 660 can vary such as along the entire length of bracket 655, desirably along only a portion thereof, or even extend from one bracket to an adjacent bracket, not preferred. Also, the number of such brackets that extend circumferential about shaft 620 can vary such as desirably two or more as shown in FIG. 2, to several, such as up to three, up to four, up to six, etc.

The various scraper blades generally have a height that is greater than the distance from the radial outer edge of bracket 655 to vessel 300 so that the radial outward end of scraper blade 660 is dragged along the bottom portion of vessel 300 whereby it can contact any solid inert residue therein and importantly also stir or mix the liquid, or the semi-molten, or the molten material, or the solid inert residue, or any combination thereof to generally ensure total evaporation thereof. Moreover, along the longitudinal length of vessel 300, the radial height of scraper blade 660 that extends outward from bracket 655 can be greater than at another longitudinal section of vessel 300. Thus, the scraper radial height is greater at the central longitudinal portion of vessel 300, that is typically bowed outward due to expansion thereof, so that the scraper blade can radially contact vessel bottom 300. However, with respect to the liquid, or the semi-molten, or the molten waste material, or the solid inert residue, or any combination thereof within vessel 300, it does not serve to move the same forward or in a longitudinal direction along the length of said vessel. Rather, longitudinal movement of the waste material, etc., is accomplished by helical rakes 650.

Figure 3:
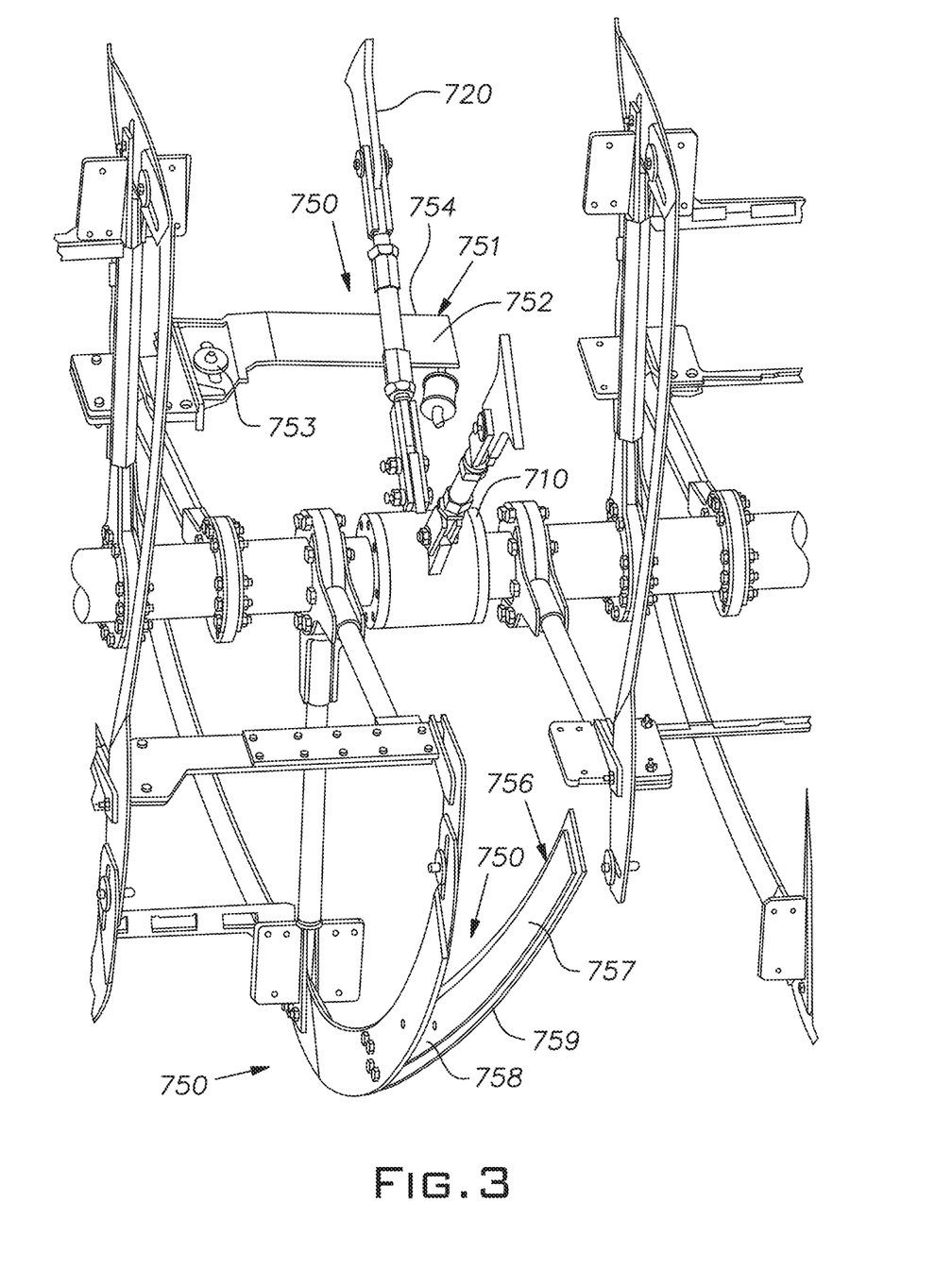
FIG. 3 is an elevation view of a portion of the rotating conveyor device showing auxiliary scraper blades that are retractable so that they are capable of sweeping under a support device and moving said waste material therethrough.

The above system lacks any structure to move the waste material longitudinally along the reactor vessel towards discharge chamber 330 between adjacent rotating conveyor devices 630. This problem is readily solved by the structure set forth in FIG. 3 that exists between the longitudinal spacings or openings between an end of one rotating conveyor device 630 and the beginning of the adjacent downstream rotating conveyor device 630 as shown in FIG. 2. As shown in FIG. 3, desirably, a bearing exists between the above-noted adjacent ends of rotating conveyor device 630 that supports stirring assembly shaft 620 that extends the entire length of vessel 300. Bearing 710 is supported by support arms 720 that are attached or fixed to vessel interior wall 390 in any conventional manner such as by welding, bolts and nuts, etc. The waste material, that is the liquid, or semi-molten, or molten material, or SIR material is moved laterally or longitudinally underneath or below shaft support bearing 710 area by one or more sweeping devices 750 that generally have retractable arms 751 and 756 in order to avoid contact with stationary support arms 720 upon rotation of rotating conveyor devices 630. Several different varieties of such said sweeping devices 750 can be utilized such as the two embodiments set forth hereinbelow. Additional sweeping devices 750 can be utilized so long as they generally have retractable arms that avoid damaging the shaft support arms 720 upon rotation of rotating conveyor device 630.

The two preferred embodiments include flipper arm sweeping device 751 and springer arm sweeping device 756. The flipper arm device is clearly shown in FIG. 3 wherein longitudinal extending flipper shoe 752 extends longitudinally outwardly from rotating conveyor device 630 to which it is pivotally attached. Flipper shoe 752 generally has a bottom longitudinal edge, that conforms to the shape of the vessel bottom that extends under shaft support bearing 710 whereby upon rotation of rotating conveyor device 630, the bottom of flipper shoe 752 comes into close contact with, or actually resides on and thus scrapes vessel interior wall 390 along the bottom area of vessel 300 where the liquid, semi-molten, molten, or SIR material exists. Flipper arm 751 can exist by itself or in combination with springer arm 756. In order to provide forward movement of the waste material longitudinally along the bottom of vessel 300 towards the egress thereof, flipper arm 751 can be slanted at an angle so the waste material is moved forward, that is longitudinally from left to right of FIGS. 1 and 2, towards the vessel egress 330. Flipper arm 751 is pivotally attached at pivot point 753 to the end of rotating conveyor device 630 in such a manner so that upon rotation of conveyor device 630, the flipper shoe falls to a downward position by gravity so that it does not contact bearing support arms 720 that are fixedly or permanently attached to vessel interior walls 390.

A second sweeping device in the form of springer arm 756 is attached to another portion of the end of rotating conveyor device 630, for example, such that it is generally opposite to flipper arm 751. Springer arm 756 contains blade 757 that is attached by any flexible or springer element 758, for example a hinge and a spring, to the end of rotating conveyor device 630. Springer arm blade 757 also has a scraper edge 759 that conforms to the bottom of vessel material wall 390 so that upon rotation of springer arm 756, the above-noted waste material is longitudinally moved forward or toward the egress end of vessel 300, through the area located below shaft support bearing 710. The forward extent of springer arm blade 757 can laterally extend beyond the location of bearing support arm 720 since upon blade 757 contact with support arms 720, said springer blade will move inward towards the end of rotating conveyor device 630. That is, upon rotation of conveyor device 630, springer arm blade 757 will contact shaft bearing arm 720 and being resiliently attached to the end of rotating conveyor device 630, will be pressed inward and thus not jam or impede rotation of rotating conveyor device 630. Additionally, the springer arm can move vertically and laterally in slots to give flexibility with regards to vessel geometry. In particular, the slots allow the springer to contact and scrape the bottom of the vessel, while also falling away from the wall and the vessel top such that wear is reduced and the springer arm does not get jammed against the vessel walls.

Thus, the inclusion of sweeping devices 750, permit movement of the above-noted waste material continuously along the length of reactor vessel 300, i.e. from left to right of FIGS. 1, 2, and 3 by helical rakes 650 and sweeping devices 750.

While in accordance with the patent statutes, the best mode and preferred embodiment have been set forth, the scope of the invention is not limited thereto, but rather by the scope of the attached claims.

What is claimed is:

1. A plastic conversion vessel, comprising:
   an ingress, an egress, a longitudinal axis, and multiple product gas exhaust vents located at a top of the vessel;
   one or more shafts, said one or more shafts, independently, having a rotatable conveying device, said rotatable conveying device comprising one or more rakes for moving waste comprising a liquid, a semi-molten material, or a molten material, or a solid inert residue, or any combination thereof, longitudinally through said vessel towards said egress, said semi-molten or molten material comprising one or more polymers or hydrocarbonaceous compounds, or both;
   one or more longitudinally extending brackets attached to the one or more rakes;
   one or more scraper blades; said scraper blades operatively, and independently attached to the one or more brackets and able to slide a radial distance inward and outward in relation to the one or more brackets so that they can scrape the bottom of said vessel upon rotation of said conveying device; and
   wherein the one or more shafts are located below the longitudinal axis of the vessel such that a headspace for gases is present above the one or more rakes and the one or more scraper blades whereby the gases can exit the vessel through the exhaust gas vents.

2. The plastic conversion vessel according to claim 1, wherein the one or more brackets are attached to a periphery of the one or more rakes.

3. The plastic conversion vessel according to claim 2, wherein an outer diameter of a radial width of the one or more rakes is such that when located at the bottom of the vessel the one or more rakes do not touch the bottom of the vessel.

4. The plastic conversion vessel according to claim 3, including a plurality of support arms that connect said one or more rakes to said shaft.

5. The plastic conversion vessel according to claim 4, wherein said scraper blades are located along said longitudinal axis in said vessel, and wherein said scraper blades are for stirring and/or mixing said liquid, or said semi-molten, or molten waste material, or said solid inert residue, or any combination thereof.

6. The plastic conversion vessel according to claim 5, wherein said scraper blades do not move said waste material through said plastic conversion vessel along said longitudinal axis.

7. The plastic conversion vessel according to claim 6, wherein said one or more rakes is a helical screw that has a radial width; said helical screw upon rotation thereof capable of engaging and moving said liquid, or said semi-molten, or said molten waste material, or said solid inert residue, or any combination thereof through said vessel.

8. The plastic conversion vessel according to claim 3, wherein said one or more rakes is a helical screw that has a radial width; said helical screw upon rotation thereof capable of engaging and moving said waste material and conveying said solid inert residue through said vessel.

9. The plastic conversion vessel according to claim 4, wherein said one or more rakes is a helical screw that has a radial width; said helical screw upon rotation thereof capable of engaging and moving said liquid, or said semi-molten, or said molten waste material, or said solid inert residue, or any combination thereof through said vessel.

10. The plastic conversion vessel according to claim 5, wherein said one or more rakes is a helical screw that has a radial width; said helical screw upon rotation thereof capable of engaging and moving said liquid, or said semi-molten, or said molten waste material, or said solid inert residue, or any combination thereof through said vessel.

11. A process for stirring material in a plastic conversion vessel,
comprising a vessel, said vessel comprising an ingress, an egress, a longitudinal axis, and multiple product gas exhaust vents located at a top of the vessel,
said process comprising the steps of moving waste material comprising a liquid, or a semi-molten material, or a molten material, or a solid inert residue, or any combination thereof, longitudinally through said plastic conversion vessel, said vessel comprising one or more shafts, independently, having a rotatable conveying device, said rotatable conveying device comprising one or more rakes for moving said waste material, or any combination thereof, through said vessel towards said egress, said semi-molten, and/or said molten material comprising one or more polymers or hydrocarbonaceous compounds, or both;
one or more scraper blades; said scraper blades operatively, and independently attached to the one or more brackets and able to slide a radial distance inward and outward in relation to the one or more brackets so that they can scrape the bottom of said vessel upon rotation of said conveying device; and
wherein the one or more shafts are located below the longitudinal axis of the vessel such that a headspace for gases is present above the one or more rakes and the one or more scraper blades whereby the gases can exit the vessel through the exhaust gas vents.

12. The process according to claim 11, wherein the one or more brackets are attached to a periphery of the one or more rakes and wherein an outer diameter of a radial width of the one or more rakes is such that when located at the bottom of the vessel the one or more rakes do not touch the bottom of the vessel.

13. The process according to claim 12, wherein said one or more rakes is a helical screw, and including a plurality of support arms that connect said one or more rakes to said shaft.

14. The process according to claim 13, wherein said scraper blades are located along said longitudinal axis in said vessel; and said scraper blades are for stirring said liquid, or said semi-molten, or said molten waste material, or said inert residue material, or any combination thereof.

15. The process according to claim 14, wherein said scraper blades and said helical screw engages and moves said liquid, or said semi-molten, or said molten waste material, or said inert residue material, or any combination thereof, and conveys said solid inert residue, through said vessel.

16. A plastic conversion vessel, comprising:
said vessel having an ingress, an egress, and an interior wall;
at least two shafts, each having a rotatable conveying device for moving waste material or a solid inert residue, or both, longitudinally through said vessel towards said egress;
at least one support housing in said vessel, said support housing located between said rotatable conveying devices, said support housing having arms that are fixed to said vessel interior wall; and
said conveying device having one or more auxiliary scraper blades that are retractable so that they are capable of sweeping under said support housing and moving said waste material therethrough.

17. The plastic conversion vessel according to claim 16, wherein said one or more auxiliary scraper blades, independently, comprise a flipper arm, or a spring arm, or both.

18. The plastic conversion vessel according to claim 17, wherein said one or more spring arms contain a spring.

19. The plastic conversion vessel according to claim 17, wherein said flipper arm comprises a pivot point, and said flipper arm being capable of pivoting about said pivot point.

20. The plastic conversion vessel according to claim 16, wherein said one or more auxiliary scraper blades comprise a flipper arm.

21. The plastic conversion vessel according to claim 16, wherein the rotatable conveying device comprises one or more rakes for moving the waste material or the solid inert residue or both, longitudinally through the vessel towards said egress, wherein said rotatable conveying device, independently, has one or more scraper blades, said scraper blades operatively and independently attached to said rake, and wherein said scraper blades each have a height so that they can scrape the bottom of the vessel upon rotation of the rotatable conveying device.

* * * * *